(12) United States Patent
Huang et al.

(10) Patent No.: US 9,400,006 B1
(45) Date of Patent: Jul. 26, 2016

(54) PIVOT PIN WITH DETENT PIN INSTALLATION FEATURE

(71) Applicants: George Huang, Henderson, NV (US); Roger Wang, Malibu, CA (US)

(72) Inventors: George Huang, Henderson, NV (US); Roger Wang, Malibu, CA (US)

(*) Notice: Subject to any disclaimer, the term of this patent is extended or adjusted under 35 U.S.C. 154(b) by 298 days.

(21) Appl. No.: 14/010,741

(22) Filed: Aug. 27, 2013

(51) Int. Cl.
*F16B 19/00* (2006.01)
*F16B 19/02* (2006.01)

(52) U.S. Cl.
CPC ...................................... *F16B 19/02* (2013.01)

(58) Field of Classification Search
USPC ............ 42/75.01, 75.03, 106; 89/1.1; 74/1 R, 74/469; 227/156
See application file for complete search history.

(56) References Cited

U.S. PATENT DOCUMENTS

| | | | |
|---|---|---|---|
| 5,488,795 A * | 2/1996 | Sweat ..................... | F41A 33/02 362/112 |
| 2004/0137988 A1 * | 7/2004 | Parsons ................... | F41H 9/10 463/47.2 |

* cited by examiner

*Primary Examiner* — J. Woodrow Eldred
(74) *Attorney, Agent, or Firm* — Shaddock Law Group, PC

(57) ABSTRACT

A pin that includes a head and a shank that extends from a shoulder of the head to a terminal surface. A primary channel is formed in a portion of the pin and extends from a portion of the head, along a longitudinal axis of the pin, into a portion of the shank. The primary channel includes a primary recess formed proximate each end of the primary channel. An installation channel is formed in a portion of the pin that extends from a portion of the primary channel, along a longitudinal axis of the pin, towards the terminal surface. The installation channel includes an installation recess formed proximate an end of the installation channel.

19 Claims, 10 Drawing Sheets

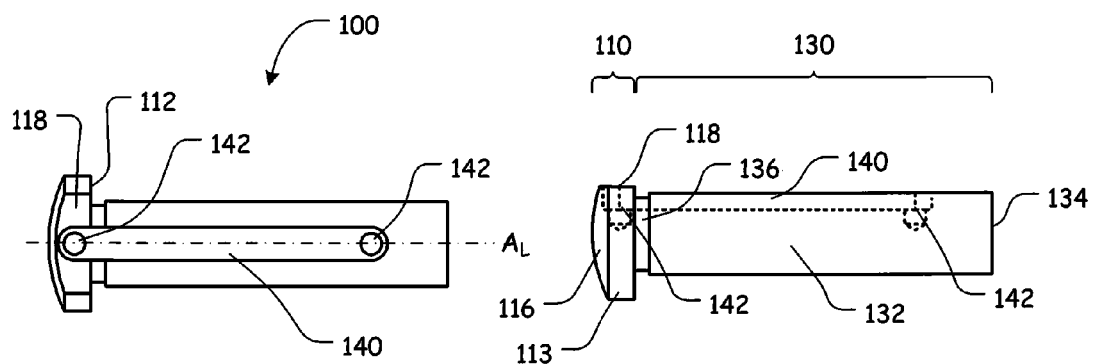
FIG. 2A
PRIOR ART
FIG. 2B
PRIOR ART
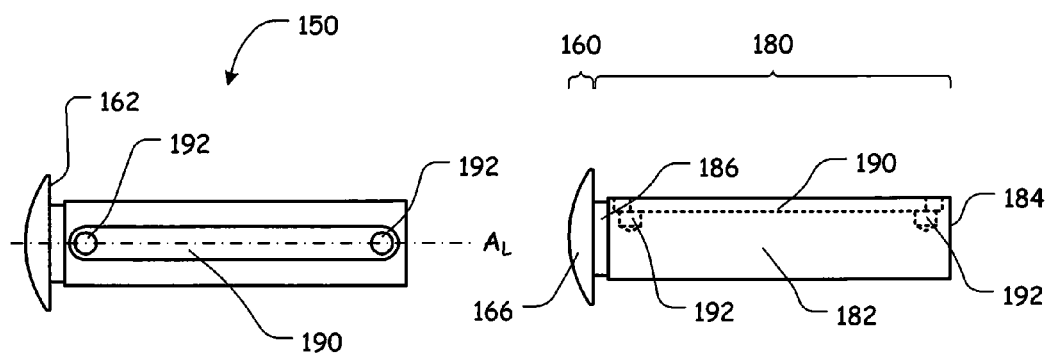
FIG. 3A
PRIOR ART
FIG. 3B
PRIOR ART

US 9,400,006 B1

PIVOT PIN WITH DETENT PIN INSTALLATION FEATURE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of installation pins. More specifically, the present invention relates to pins to aid in the assembly and disassembly of various components.

2. Description of Related Art

Various firearms comprise certain components that are held together by one or more pins being releasably secured within apertures of the various components. One such firearm is the AR-15.

The AR-15 is based on the AR-10, which was designed by Eugene Stoner, Robert Fremont, and L. James Sullivan of the Fairchild ArmaLite corporation in 1957. Today, there are numerous variants of the AR-15 that are manufactured by a number of companies. The AR-15 and its various related derivative platforms are used by civilians, law enforcement personnel, and military forces around the world.

One of the reasons for the AR-15's widespread popularity and usage is its modularity. The AR-15 can initially be broken down into two main components, an upper receiver and a lower receiver. The upper receiver includes two lugs, each of which includes an aperture formed therethrough. The lower receiver includes cutouts for receiving the lugs of the upper receiver and appropriate apertures to be aligned with the upper receiver lug apertures.

When the upper receiver and the lower receiver are appropriately aligned, a pivot pin is slidably secured within the aligned apertures proximate the front of the lower receiver and a take-down pin is slidably secured within the aligned apertures proximate the rear of the lower receiver to secure the upper receiver to the lower receiver. Once initially installed within the appropriate apertures in the lower receiver, the pivot pin and the take-down pin each slide between a locked and an unlocked position, but remain attached or coupled to the lower receiver via interaction of a spring biased detent pin and a primary channel and primary recesses formed in the pivot pin and the take-down pin.

Because the upper and lower receivers are secured with slidably movable pins, the upper receiver can optionally be pivoted on the lower receiver or removed from the lower receiver. This allows a user to access various components of the firearm more easily for cleaning and lubrication. Additionally, alternate upper receivers can be used with a single lower receiver or vice versa.

Any discussion of devices, documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

Unfortunately, it can be quite difficult to initially install the pivot pin in the lower pivot pin apertures of the lower receiver. During initial installation, a detent pin spring is inserted in the detent pin spring recess and a detent pin is positioned atop the detent pin spring. The detent pin is then urged into the detent pin spring recess, compressing the detent pin spring. While the detent pin is maintained within the detent pin spring recess, an initial, rounded portion of the pivot pin is used to maintain the detent pin in the detent pin spring recess until the pivot pin can be installed a sufficient distance to allow the detent pin to be received within a primary channel formed in the pivot pin.

Initial installation requires the rounded portion of the initial end of the pivot pin to contact and maintain an urging force on the rounded or pointed terminal end of the spring biased detent pin. In addition, the detent pin spring, once in the detent pin spring recess, sticks out a few coils. The detent pin has to push on the tip of the detent pin spring and also push back against the rounded side of the pivot pin, resulting in 3 parts and 2 pivot points. The detent pin is not yet in the detent pin spring recess when installation begins, so the detent pin can easily wobble left/right. This creates a very unstable situation, even without spring pressure from the detent pin spring. With the addition of spring pressure, installation of the detent pin is nearly impossible. Therefore, it is not uncommon for detent pins to lose contact with the surface of the pivot pin and be ejected from the detent pin spring recess.

Certain separate and distinct tools have been created to help with the installation of the detent pin. Unfortunately, many users may not have any such tools unless they routinely install the pivot pins in receivers. Some users have attempted to use screwdrivers, pliers, tweezers, razor blades, etc. to help with the installation of the pivot pin. Generally, use of these types of tools is ineffective and can be a hazard to the user's fingers.

Because of the relatively small gap between the lower receiver and the pivot pin and the dimensioning and shape of the various surfaces of known pivot pins and detent pins, it is virtually impossible to use tools or other devices to aid in the installation of the pivot pin.

A redesigned pivot pin would make installation easier and more efficient. Thus, the pivot pin of the present invention includes an initial end that incorporates features that allow a user/operator to use the pivot pin as a tool to install the detent pin more easily without significantly altering the overall size and shape of the pivot pin, when compared to the standard, original pivot pin size. This is a significant difference and improvement over current pivot pin designs.

In various exemplary, non-limiting embodiments, the firearm pins of the present invention comprise a head, wherein the head extends from a shoulder to a crown; a shank that extends from the shoulder to a terminal surface; a primary channel formed in a portion of the pin, wherein the primary channel extends from a portion of the head, along a longitudinal axis of the pin, into a portion of the shank, and wherein the primary channel includes a primary recess formed proximate each end of the primary channel; and an installation channel formed in a portion of the pin, wherein the installation channel extends from a portion of the primary channel, along a longitudinal axis of the pin, towards the terminal surface, and wherein the installation channel includes an installation recess formed proximate an end of the installation channel.

In certain exemplary, nonlimiting embodiments, the pin, or at least a portion of the pin, is fully or partially magnetized.

In certain exemplary embodiments, a face is formed between the shoulder and the crown. In certain exemplary, nonlimiting embodiments, the face is a single, a planar or conically shaped face, which may be formed at an angle of between approximately 1° and 89° relative to a longitudinal axis of the pin. The face may comprise a continuous or an interrupted surface that can be substantially smooth, textured, and/or include a plurality of dimples.

In certain exemplary, nonlimiting embodiments, the pin may include a groove formed in the face.

Certain other optional features of the firearm pin include a chamfer at provides a transitional surface between a terminal surface and an outer surface of the shank, an indention formed in the terminal surface.

Accordingly, the presently disclosed invention provides firearm pins that can be used to secure firearm components together.

The presently disclosed invention separately provides firearm pins that optionally allow a user to install a detent pin in a firearm lower receiver without the use of additional tools.

The presently disclosed invention separately provides firearm pins that may optionally provide a detailed or specialized surfaces for proper alignment of a tool or the tip of a round/bullet, should a user wish to use a tool or the tip of a round/bullet to urge the pins from a locking position to a release position.

The presently disclosed invention separately provides firearm pins that can be easily manipulated by a user.

These and other features and advantages of the presently disclosed firearm pin are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed. herein. However, it is to be understood that the disclosed embodiments are merely exemplary of the invention that may be embodied in various and alternative forms. The drawing figures are not necessarily to scale and some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 2A illustrates a front view of a known firearm pivot pin;

FIG. 2B illustrates a left side view of a known firearm pivot pin;

FIG. 3A illustrates a front view of a known firearm take-down pin;

FIG. 3B illustrates a left side view of a known firearm take-down pin;

DETAILED DESCRIPTION OF THE INVENTION

Figure 1:
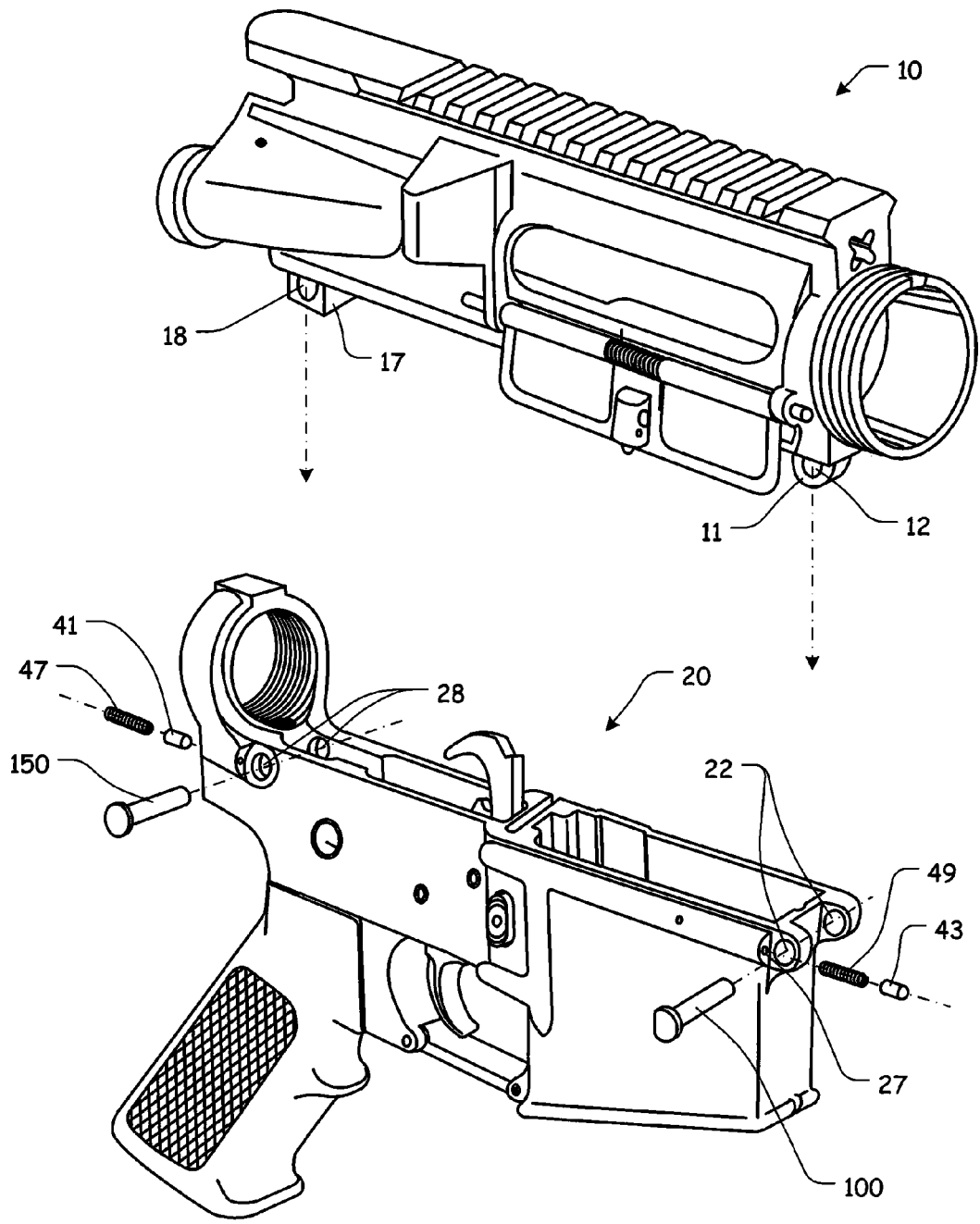
FIG. 1 illustrates a perspective view of certain components of an AR-15 style upper and lower receiver.

For simplicity and clarification, the design factors and operating principles of the firearm pins according to this invention are explained with reference to various exemplary embodiments of firearm pins according to this invention. The basic explanation of the design factors and operating principles of the firearm pins is applicable for the understanding, design, and operation of the firearm pins of this invention. It should be appreciated that the firearm pins can be adapted to many applications where two or more components are attached or coupled together using pins.

It should also be appreciated that the terms "AR-15", "firearm", "pivot pin", "pin", and "firearm pins" are used for basic explanation and understanding of the operation of the systems, methods, and apparatuses of this invention. Therefore, the terms "AR-15", "firearm", "pivot pin", "pin", and "firearm pins" are not to be construed as limiting the systems, methods, and apparatuses of this invention. Thus, the terms "AR-15" and "firearm" are to be understood to broadly include any firearm having two or more components capable of being attached or coupled together using pins.

For simplicity and clarification, the firearm pins of this invention will be described as being used to attach or coupled an AR-15 upper receiver to an AR-15 lower receiver. However, it should be appreciated that these are merely exemplary embodiments of the firearm pins and are not to be construed as limiting this invention. Thus, the firearm pins of this invention may be utilized to attach or coupled components of any firearm or other device.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

Turning now to the drawing Figures, FIGS. 1-4B illustrate certain elements and/or aspects of a known, exemplary AR-15 upper receiver 10 being attached or coupled to an exemplary AR-15 lower receiver 20 using a known receiver pivot pin 100 and receiver take-down pin 200.

The pivot pin 100 comprises a head 110 and a shank 130. The shank 130 includes a shank portion 132 that extends from a planar terminal surface 134 to a shoulder 112 of the head 110. In some embodiments, an intermediate portion 136, having a reduced diameter when compared to a diameter of the shank portion 132, is formed or disposed between the shank portion 132 and the shoulder 112.

The head 110 extends from the shoulder 112 to a crown 116. In certain embodiments, a face 114, which is parallel to the longitudinal axis $A_L$, is formed or disposed between the shoulder 112 and the crown 116. A flat 118 is typically provided in a portion of the head 110. A surface of the flat 118 is generally formed parallel to a longitudinal axis $A_L$ of the pivot pin 100 so as to allow the pivot pin 100 to be appropriately inserted within the lower pivot pin apertures 22 of the lower receiver 20.

A continuous, elongate primary channel 140 is formed in the pivot pin 100 and extends along the longitudinal axis $A_L$ from the shank portion 132 into the head 110. A primary recess 142 is formed proximate each end of the primary channel 140.

The take-down pin 150 also comprises a head 160 and a shank 180. The shank 180 includes a shank portion 182 that extends from a planar terminal surface 184 to a shoulder 162 of the head 160. In some embodiments, an intermediate portion 186, having a reduced diameter when compared to a diameter of the shank portion 182, is formed or disposed between the shank portion 182 and the shoulder 162.

The head 160 extends from the shoulder 162 to a crown 166.

A continuous, elongate primary channel 190 is formed in the shank portion 182 of the take-down pin 150, along the longitudinal axis $A_L$ of the take-down pin 150. A primary recess 192 is formed proximate each end of the primary channel 190.

Generally, the upper receiver 10 includes an upper pivot pin lug 11 having an upper pivot pin aperture 12 and an upper take-down lug 17 having an upper take-down lug aperture 18. The lower receiver 20 includes cutouts, recesses, or areas for receiving the lugs 11 and 17 so that the upper pivot pin aperture 12 can be aligned with the lower pivot pin apertures 22 and the upper take-down lug aperture 18 can be aligned with the lower take-down lug apertures 28.

Figures 4A, 4B:
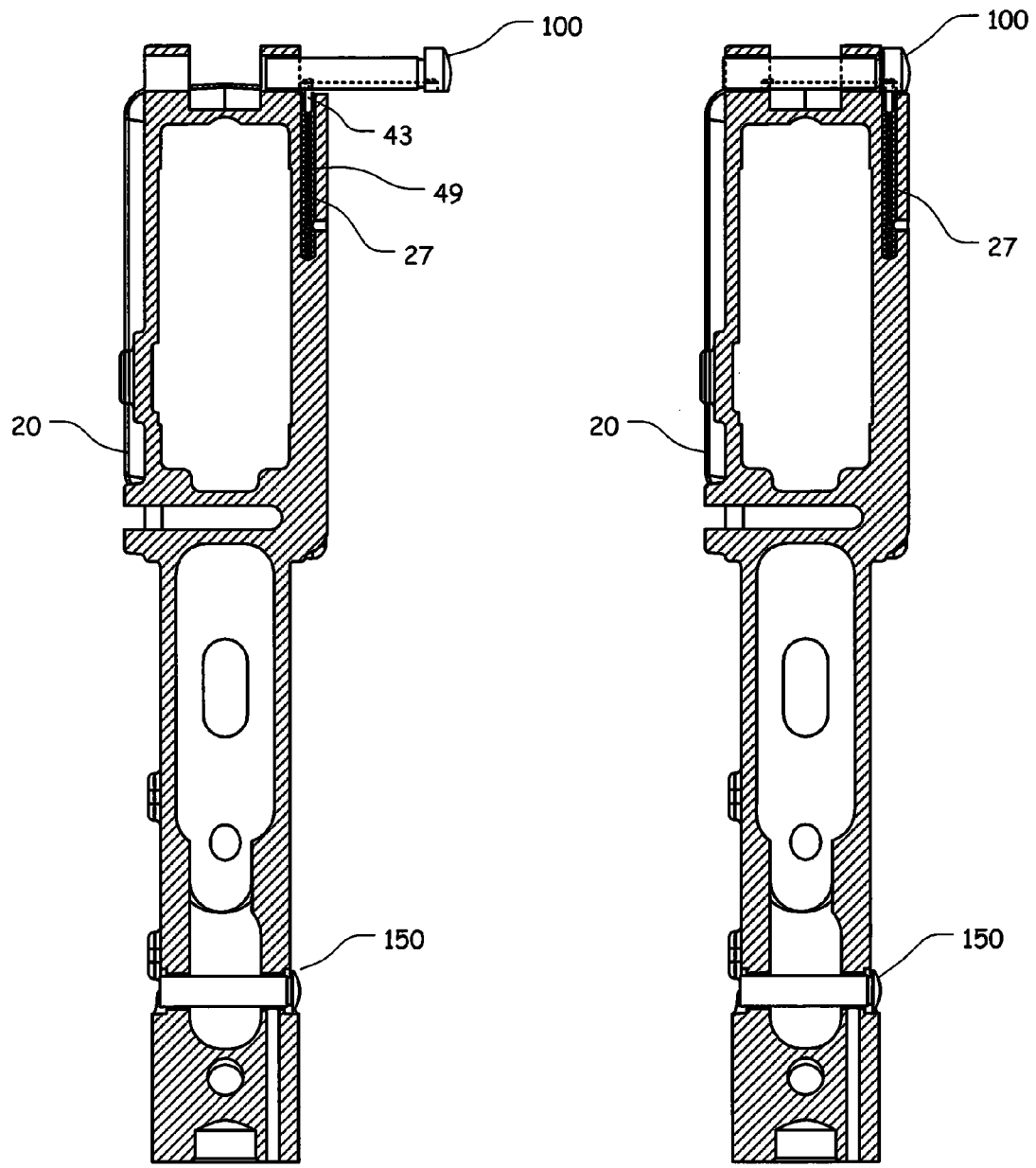
FIG. 4A illustrates a top, view of a known take-down pin and pivot pin positioned within a cross-sectional view of a lower receiver, wherein the pivot pin is in an open position.
FIG. 4B illustrates a top view of a known take-down pin and pivot pin positioned within a cross-sectional view of a lower receiver, wherein the pivot pin is in a closed position.

The receiver pivot pin 100 is usually maintained within at least one of the lower pivot pin apertures 22 via engagement of a detent pin 43 within the primary channel 140 of the pivot pin 100. A detent pin spring 49, positioned within the detent pin spring recess 27, provides a spring biasing force that urges the detent pin 43 into the primary channel 140. Once the primary channel 140 is engaged by the detent pin 43, the pivot pin 100 is slidably movable between a release position, as illustrated in FIG. 4A, and a locking position, as illustrated in FIG. 4B, but is maintained within at least one of the lower pivot pin apertures 22.

When the pivot pin 100 is in the release position, the shank portion 132 is outside of the cutout between the lower pivot pin apertures 22, sufficient to allow the upper pivot pin lug 11 to be positioned within or removed from the cutout between the lower pivot pin apertures 22. Alternatively, when the pivot pin 100 is in the locking position (as illustrated in FIG. 4), at least a portion of the shank portion 132 is positioned within each of the lower pivot pin apertures 22.

The primary recesses 142 are formed so as to be engaged by the detent pin 43 at the release position and the locking position. In this manner, additional frictional engagement is provided between the detent pin 43 and the pivot pin 100 to further secure the pivot pin 100 in the release position or the locking position.

Similarly, the receiver take-down pin 150 is usually maintained within at least one of the lower take-down pin apertures 28 via engagement of a detent pin 41 within the primary channel 190 of the take-down pin 150. A detent pin spring 47 provides a spring biasing force that urges the detent pin 41 into the primary channel 190. Once the primary channel 190 is engaged by the detent pin 41, the take-down pin 150 is slidably movable between a release position and a locking position, but is maintained within at least one of the lower take-down pin apertures 28.

When the take-down pin 150 is in the release position, the shank portion 182 is outside of the cutout or void between the lower take-down pin apertures 28, sufficient to allow the upper take-down pin lug 17 to be positioned within or removed from the cutout between the lower take-down pin apertures 28. Alternatively, when the take-down pin 150 is in the locking position (as illustrated in FIG. 4), at least a portion of the shank portion 182 is positioned within each of the lower take-down pin apertures 28.

The primary recesses 192 are formed so as to be engaged by the detent pin 41 at the release position and the locking position. In this manner, additional frictional engagement is provided between the detent pin 41 and the take-down pin 150 to further secure the take-down pin 150 in the release position or the locking position.

When the upper receiver 10 and the lower receiver 20 are appropriately aligned, the upper pivot pin lug aperture 12 is aligned between the lower pivot pin lug apertures 22 such that the pivot pin 100 can be slidably moved to the locking position and the upper take-down lug aperture 18 is aligned between the lower take-down lug apertures 28 such that the take-down pin 150 can be slidably moved to the locking position. Generally, attaching the upper receiver 10 to the lower receiver 20 is accomplished by first coupling or attaching, via the pivot pin 100, the upper pivot pin lug 11 to the lower receiver 20. Then, the upper receiver 10 is pivoted, via interaction between the pivot pin 100 and the upper pivot pin lug aperture 12, until the upper take-down lug aperture 18 is appropriately aligned between the lower take-down lug apertures 28 and the take-down pin 150 is slidably moved to the locking position.

It should also be appreciated that a more detailed explanation of the components of the upper receiver 10, lower receiver 20, pivot pin 100, and take-down pin 150, instructions regarding how to attach and remove the upper receiver 10 and the lower receiver 20, methods for installing the pivot pin 100 and/or the take-down pin 150 within the lower receiver 20, and certain other items and/or techniques necessary for the implementation and/or operation of the various components of the AR-15 platform are not provided herein because such components are commercially available and/or such background information will be known to one of ordinary skill in the art. Therefore, it is believed that the level of description provided herein is sufficient to enable one of ordinary skill in the art to understand and practice the method as described.

FIGS. 5A-7C illustrate certain elements and/or aspects of a first exemplary embodiment of a firearm pivot pin 200, according to this invention. As illustrated in FIGS. 5A-7C, the pivot pin 200 includes at least some of a head 210, a shank 230, a shank portion 232, a terminal surface 234, a shoulder 212, an intermediate portion 236, a crown 216, an elongate primary channel 240, primary recesses 242, a flat 218, and a face 213.

It should be understood that each of these elements corresponds to and operates similarly to the head 110, the shank 130, the shank portion 132, the terminal surface 134, the shoulder 112, the intermediate portion 136, the crown 116, the elongate primary channel 140, the primary recesses 142, the flat 118, and the face 113, as described above with reference to the pivot pin 100 of FIGS. 1-4B.

However, as illustrated in FIGS. 5A-7C, an installation channel 245 is formed in a portion of the pivot pin 200. The installation channel 245 extends from a portion of the primary channel 240, along the longitudinal axis $A_L$ of the pivot pin 200, towards the terminal surface 234.

In certain exemplary, nonlimiting embodiments, the primary channel 240 is approximately 0.095 to 0.099 inches wide and approximately 0.060 inches deep. In contrast, the installation channel 245 is approximately 0.046 inches wide, approximately 0.22 inches long, and approximately 0.025 inches deep. Thus, it should be appreciated that the primary channel 240 is deeper than the installation channel 245.

An installation recess 243 is formed proximate an end of the installation channel 245. In various exemplary embodiments, the installation channel 245 terminates in the installation recess 243. In certain exemplary, nonlimiting embodiments, the installation recess 243 is approximately 0.063 inches in diameter and extends approximately 0.060 inches from a surface of the shank 230. In certain exemplary embodiments, the installation recess 243 is formed so as to provide a desired frictional fit between a portion of a detent pin 43 and the walls of the installation recess 243. In this manner, a detent pin 43 can be held in a desired position within at least a portion of the installation recess 243, for installation in a lower receiver 20.

In certain exemplary, nonlimiting embodiments, the installation recess 243 includes a chamfer 244 to allow the detent pin 43 to be more easily accepted by the installation recess 243.

While certain exemplary dimensions for the installation channel 245 and the installation recess 243 are provided, it should be appreciated that the actual size, shape, and dimensions of the installation channel 245 and the installation recess 243 are a design choice based upon compatibility of these features with the structures of a given lower receiver 20 and/or a given detent pin 43. For example, in various exemplary embodiments, the installation channel 245 comprises a substantially straight channel. Alternatively, the installation channel 245 may be at least partially curved or include a partial or complete spiral, such that the installation of the detent pin 43 can be initiated on one side of the installation channel 245 and the pivot pin 200 can be twisted and/or turned so that the detent pin 43 is urged along the installation channel 245.

In certain exemplary, nonlimiting embodiments, the pivot pin 200, or at least a portion of the pivot pin 200, is fully or partially magnetized. In certain embodiments, the pivot pin 200 may be permanently magnetized or temporarily magnetized. In certain exemplary embodiments, all or a portion of the pivot pin 200 may be magnetized by use of an external magnetizing source, such as, for example, an external magnet.

In embodiments wherein only a portion of the pivot pin 200 is magnetized, it is preferred that a portion of the shank 230 that is proximate the installation recess 243 be magnetized. In this manner, a detent pin 43 can be magnetically secured within at least a portion of the installation recess 243.

In certain exemplary embodiments, various components of the pivot pin 200 are formed of steel. Alternate materials of construction of the various components of the pivot pin 200 may include one or more of the following: stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the pivot pin 200 is a design choice based on the desired appearance, strength, and functionality of the pivot pin 200.

It should be appreciated that certain elements of the pivot pin 200 may be formed as an integral unit (such as, for example, the head 210 and the shank 230). Alternatively, suitable materials can be used and sections or elements made independently and attached or coupled together, such as by adhesives, welding, screws, rivets, pins, or other fasteners, to form the various elements of the pivot pin 200.

It should also be understood that the overall size and shape of the pivot pin 200, and the various portions thereof, is a design choice based upon the desired functionality, appearance, and/or compatibility of the pivot pin 200.

Figure 6:
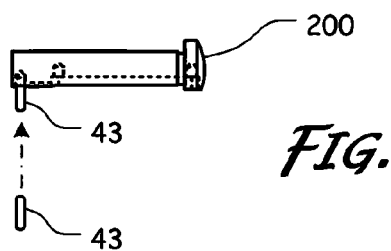
FIG. 6 illustrates a right side view of the first exemplary embodiment of firearm pivot pin, illustrating the positioning of a detent pin with in the installation recess of the pivot pin, according to this invention.
Figure 7A:
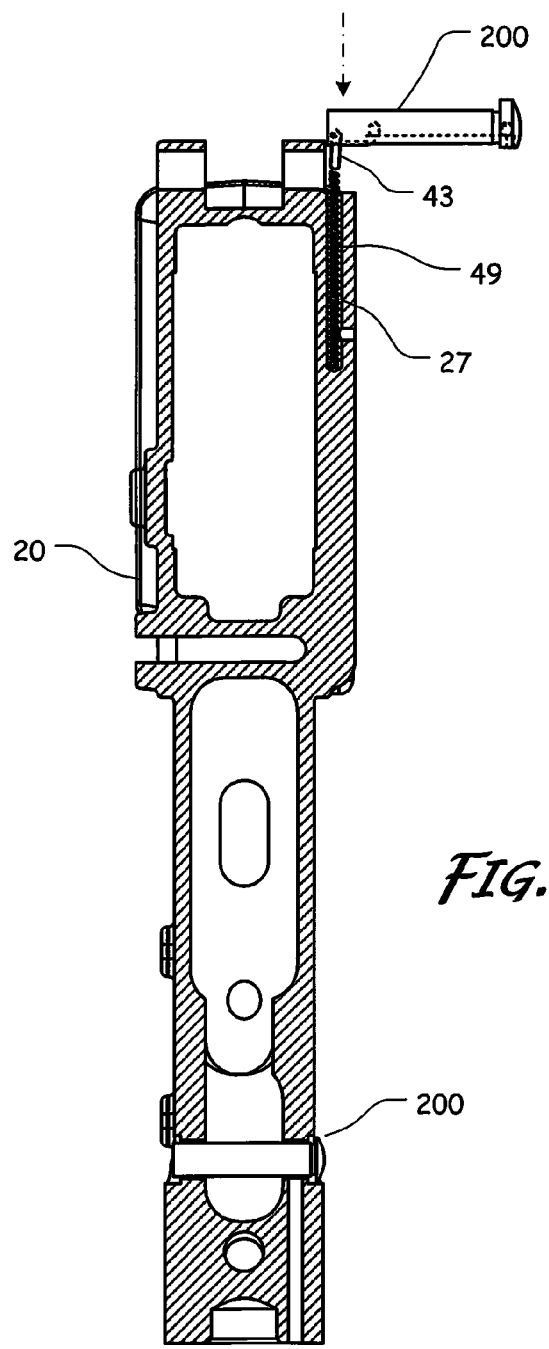
FIG. 7A illustrates a top view of a first exemplary embodiment of firearm pivot pin positioned within a cross-sectional view of a lower receiver, wherein the pivot pin is used to align the detent pin with the detent pin spring, according to this invention.
Figure 7B:
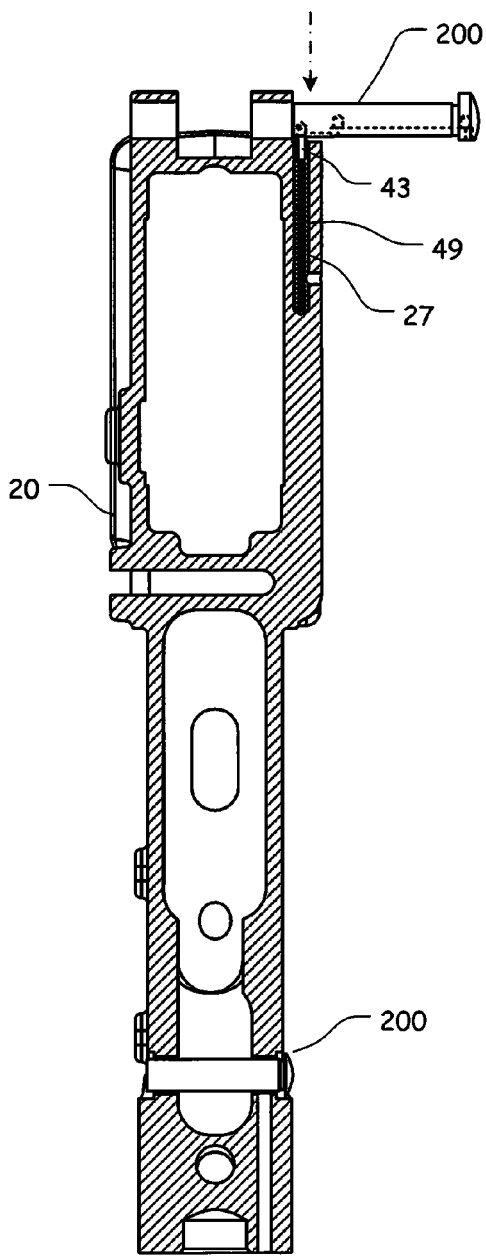
FIG. 7B illustrates a top view of a first exemplary embodiment of firearm pivot pin positioned within a cross-sectional view of a lower receiver, wherein the pivot pin is used to urge the detent pin against the detent pin spring and into the detent pin spring recess, according to this invention.
Figure 7C:
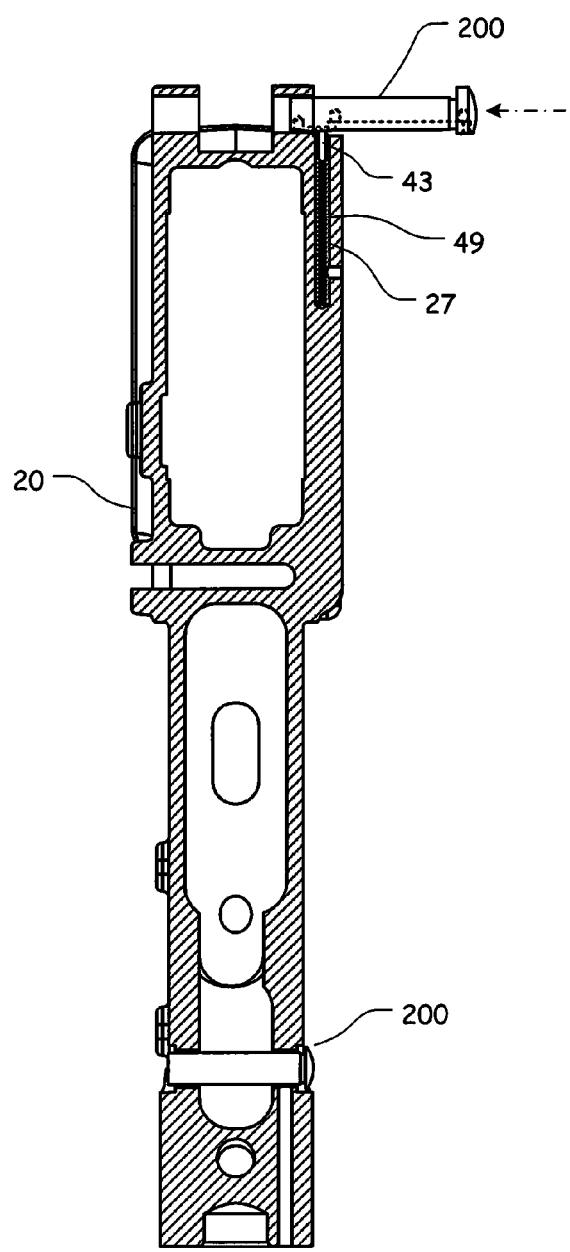
FIG. 7C illustrates a top view of a first exemplary embodiment of firearm pivot pin positioned within a cross-sectional view of a lower receiver, wherein the pivot pin is being urged towards an open position, according to this invention.

During initial installation of the pivot pin 200 in a lower receiver 20, as illustrated most clearly in FIGS. 6-7C, a detent pin spring 49 is inserted in the detent pin spring recess 27 and a detent pin 43 is positioned within at least a portion of the installation recess 243. It should be understood that a portion of the detent pin may be loosely maintained within the installation recess 243, may be relatively securely maintained within the installation recess 243 based on frictional engagement of the detent pin 43 and the installation recess 243, or be magnetically maintained within the installation recess 243.

Once releasably secured to or within a portion of the installation recess 243, as illustrated in FIG. 6, the pivot pin 200 is used to position the detent 43 atop the detent pin spring, as illustrated in FIG. 7A. Once properly aligned, a force is applied to the pivot pin 200 and the detent pin 43 is urged downward, into the detent pin spring recess 27, as illustrated in FIG. 7B. As the detent pin 43 is then urged into the detent pin spring recess 27, the detent pin spring 49 is compressed.

While the detent pin 43 is maintained within the detent pin spring recess 27, the pivot pin 200 is urged toward and into the lower pivot pin apertures 22. As a sufficient force is applied to the pivot pin 200, the detent 43 is dislodged from the installation recess 243 and travels along the installation channel 245, as illustrated in FIG. 7C, until the detent 43 reaches the channel 240.

When the detent 43 reaches the channel 240, the spring biasing pressure of the detent pin spring 49 urges the detent 43 into the primary channel 240. Because of the difference in depths between the primary channel 240 and the installation channel 245, once the detent 43 is positioned within the channel 240, the spring biasing pressure of the detent pin spring 49 maintains the detent pin 43 within the channel 240 and the detent 43 cannot be easily removed from the primary channel 240.

Therefore, it should be appreciated that once installed, the pivot pin 200 operates similarly to the pivot pin 100, as described above with reference to the pivot pin 100 of FIGS. 1-4B.

Figure 8A:
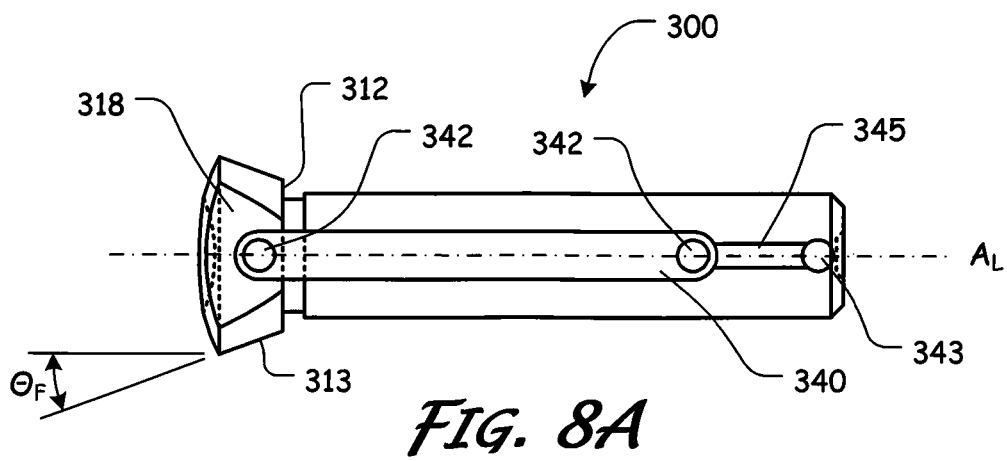
FIG. 8A illustrates a front view of a second exemplary embodiment of firearm pivot pin, according to this invention.
Figure 8B:
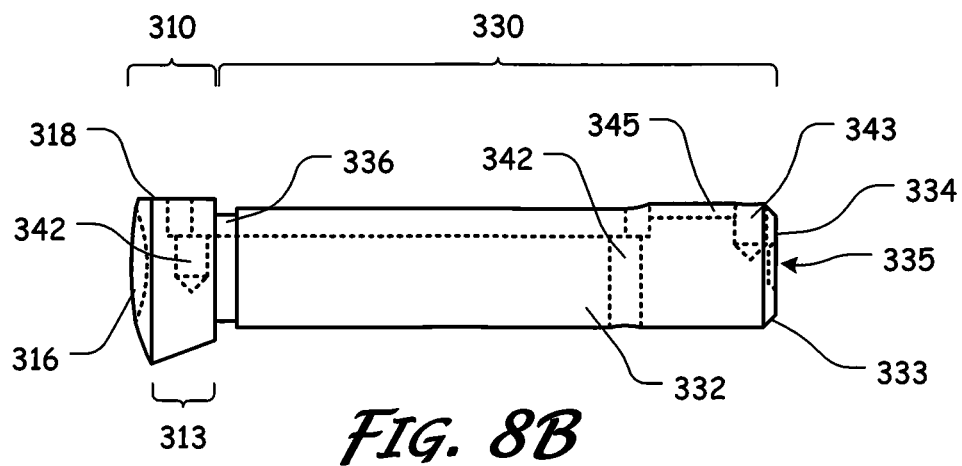
FIG. 8B illustrates a left side view of the second exemplary embodiment of firearm pivot pin, according to this invention.
Figure 8C:
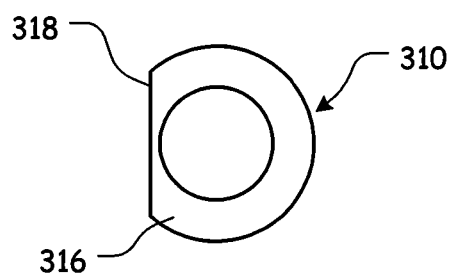
FIG. 8C illustrates a top view of the second exemplary embodiment of firearm pivot pin, according to this invention.

FIGS. 8A-8C illustrate certain elements and/or aspects of a second exemplary embodiment of a firearm pivot pin 300, according to this invention. In illustrative, non-limiting embodiment(s) of this invention, as illustrated in FIGS. 8A-8C, the pivot pin 300 comprises at least some of a head 310 and a shank 330.

The shank 330 includes an elongate, cylindrical shank portion 332 that extends from a terminal surface 334, along a longitudinal axis $A_L$ of the pivot pin 300, to a shoulder 312 of the head 310.

As illustrated, a chamfer 333 is optionally provided as a transitional surface between the terminal surface 334 and an outer surface of the shank portion 332. The chamfer 333 allows for increased ease of installation of the pivot pin 300 and also eliminates the sharp edge that would typically be found on a known pivot pin.

An indention 335 is formed in the terminal surface 334. In various exemplary embodiments, the indention 335 is of a sufficient size and depth so as to provide a recess to center a bullet or tool in a desired position relative to the terminal surface 334. In this manner, a user can engage a bullet or tool with the invention 335 such that the bullet or tool is less likely to slip off the pivot pin 300 and if used to urge the pivot pin 300 from a locking position to a release position relative to a lower receiver 20.

In certain exemplary embodiments, an intermediate portion 336, having a reduced diameter when compared to a diameter of the shank portion 332, is formed or disposed between the shank portion 332 and the shoulder 312.

The head 310 extends from the shoulder 312 to a crown 316. In various exemplary embodiments, the shoulder 312 extends from the shank portion 332 (or the intermediate portion 336, if included) perpendicular to a longitudinal axis $A_L$ of the pivot pin 300.

The crown 316 typically provides a bulbous or button shape to a terminal end portion of the head 310. However, in certain exemplary embodiments, the crown 316 may optionally comprise a recess, a planar surface, or merely a terminal surface of the face 313 (which would constitute a terminal end surface of the head 310).

It should also be appreciated that, for simplicity and clarification, the various exemplary, nonlimiting embodiments of the firearm pivot pin 300 are illustrated and/or described with reference to the crown 316 having a relatively circular profile, when viewed from a top end. However, the generally circular profile of the crown 316 is intended to be illustrative, not limiting the profile or geometry of the crown 316 to any particular shape. It should be understood that the overall profile and/or geometry of the crown 316 may comprise any overall profile or geometry, including, for example, a generally square, rectangle, triangular, pentangular, circular, oval, elliptical, elliptical torus, star, or other shape.

Therefore, it should be understood that the shape, profile, geometry texture, and/or features of the crown 316 is a design choice based, at least in part, on the desired appearance, strength, and/or functionality of the crown 316.

An elongate primary channel 340 is formed in the pivot pin 300 and extends along the longitudinal axis $A_L$ from the shank portion 332 into the head 310. A primary recess 342 is formed proximate each end of the primary channel 340.

A flat 318 is typically provided in a portion of the head 310. A surface of the flat 318 is generally formed parallel to a longitudinal axis $A_L$ of the pivot pin 300 and is centered relative to the primary channel 340 so as to allow the head 310 to be fitted adjacent structures of a lower receiver 20 such that the pivot pin 300 can be appropriately inserted within the lower pivot pin apertures 22 of the lower receiver 20. Therefore, it should be appreciated that the positioning of the flat 318 is a design choice based upon compatibility with the structures of a given lower receiver 20.

The shoulder 312 is spaced from the crown 316 and a face 313 is formed or disposed between the shoulder 312 and the crown 316. A surface of the face 313 is substantially smooth and the face 313 is formed at an angle $\theta_F$ relative to the longitudinal axis $A_L$. In certain exemplary embodiments, the angle $\theta_F$ is approximately 10°. In certain alternate exemplary embodiments, the angle $\theta_F$ is approximately 0°, 1°, 5°, 10°, 15°, 20°, 25°, 30°, 35°, 40°, 45°, 50°, 55°, 60°, 65°, 70°, 75°, 80°, 85°, or 90°. In still other exemplary embodiments, the angle $\theta_F$ is any discrete angle between approximately 1° and 89°. By providing the face 313 at such an angle relative to the longitudinal axis $A_L$, the head 310 takes on at least a partially conical shape and a user is afforded increased purchase on the head 310 of the pivot pin 300, which can aid in transitioning the pivot pin 300 from a locking position to a release position.

An installation channel 345 is formed in a portion of the pivot pin 300. The installation channel 345 extends from a portion of the primary channel 340, along the longitudinal axis $A_L$ of the pivot pin 300, towards the terminal surface 334.

In certain exemplary, nonlimiting embodiments, the primary channel 340 is approximately 0.095 to 0.099 inches wide and approximately 0.060 inches deep. In contrast, the installation channel 345 is approximately 0.046 inches wide, approximately 0.22 inches long, and approximately 0.025 inches deep. Thus, it should be appreciated that the primary channel 340 is deeper than the installation channel 345.

An installation recess 343 is formed proximate an end of the installation channel 345. In various exemplary embodiments, the installation channel 345 terminates in the installation recess 343. In certain exemplary, nonlimiting embodiments, the installation recess 343 is approximately 0.063 inches in diameter and extends approximately 0.060 inches from a surface of the shank 330. In certain exemplary embodiments, the installation recess 343 is formed so as to provide a desired frictional fit between a portion of a detent pin 43 and the walls of the installation recess 343. In this manner, a detent pin 43 can be held in a desired position within at least a portion of the installation recess 343, for installation in a lower receiver 20.

Figure 5A:
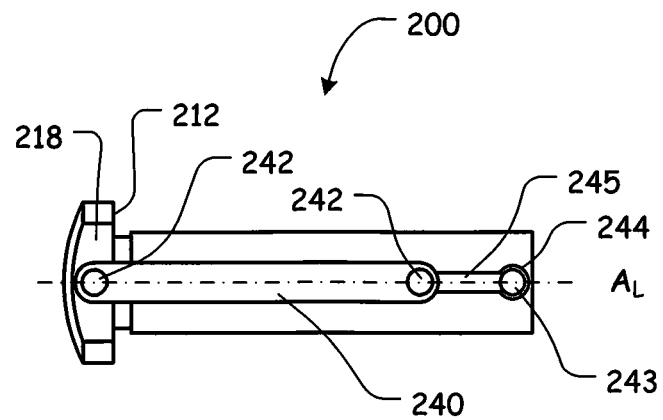
FIG. 5A illustrates a front view of a first exemplary embodiment of firearm pivot pin, according to this invention.
Figure 5B:
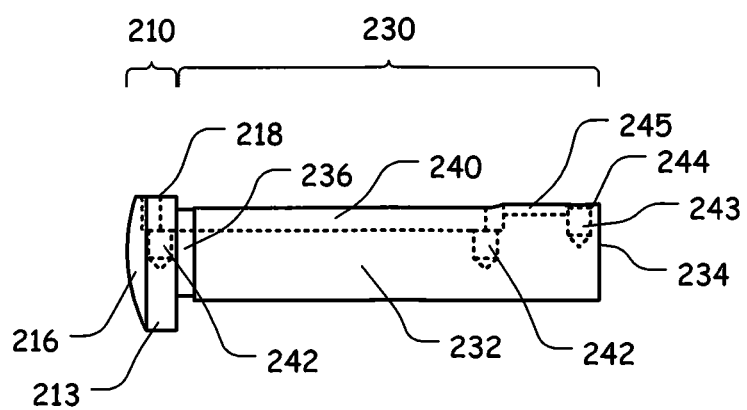
FIG. 5B illustrates a left side view of the first exemplary embodiment of firearm pivot pin, according to this invention.

In certain exemplary, nonlimiting embodiments, the installation recess 343 includes a chamfer 344 (not shown), similar to the chamfer 244 illustrated in FIGS. 5A-5C, to allow the detent pin 43 to be more easily accepted by the installation recess 343.

While certain exemplary dimensions for the installation channel 345 and the installation recess 343 are provided, it should be appreciated that the actual size, shape, and dimensions of the installation channel 345 and the installation recess 343 are a design choice based upon compatibility of these features with the structures of a given lower receiver 20 and/or a given detent pin 43.

In certain exemplary, nonlimiting embodiments, the pivot pin 300, or at least a portion of the pivot pin 300, is fully or partially magnetized. In certain embodiments, the pivot pin 300 may be permanently magnetized or temporarily magnetized. In embodiments wherein only a portion of the pivot pin 300 is magnetized, it is preferred that a portion of the shank 330 that is proximate the installation recess 343 be magnetized. In this manner, a detent pin 43 can be magnetically secured within at least a portion of the installation recess 343.

In certain exemplary embodiments, various components of the pivot pin 300 are formed of steel. Alternate materials of construction of the various components of the pivot pin 300 may include one or more of the following: stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the pivot pin 300 is a design choice based on the desired appearance, strength, and functionality of the pivot pin 300.

It should be appreciated that certain elements of the pivot pin 300 may be formed as an integral unit (such as, for example, the head 310 and the shank 330). Alternatively, suitable materials can be used and sections or elements made independently and attached or coupled together, such as by adhesives, welding, screws, rivets, pins, or other fasteners, to form the various elements of the pivot pin 300.

It should also be understood that the overall size and shape of the pivot pin 300, and the various portions thereof, is a design choice based upon the desired functionality, appearance, and/or compatibility of the pivot pin 300.

Figure 9A:
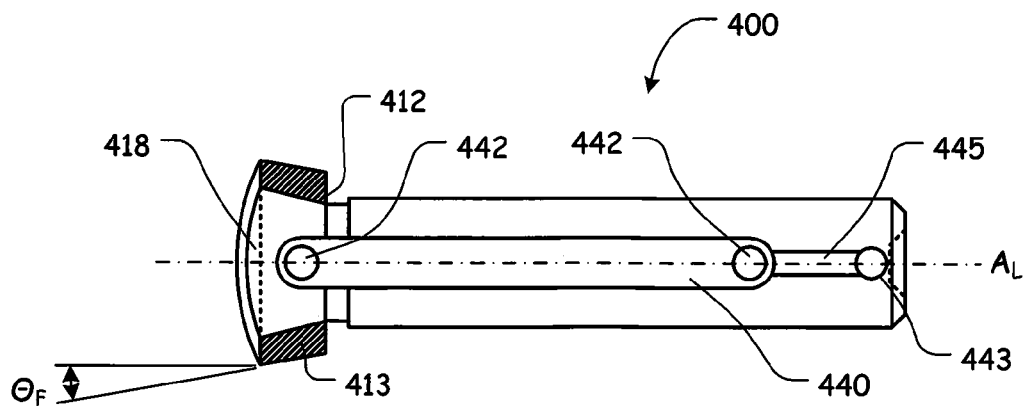
FIG. 9A illustrates a front view of a third exemplary embodiment of firearm pivot pin, according to this invention.
Figure 9B:
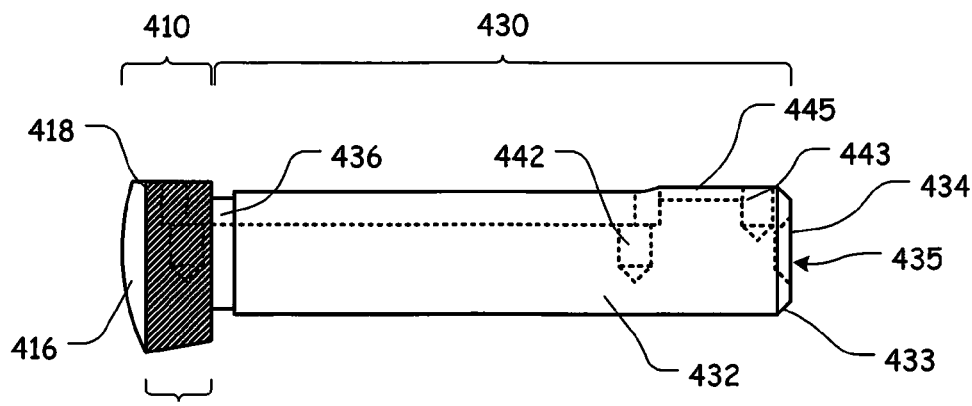
FIG. 9B illustrates a left side view of the third exemplary embodiment of firearm pivot pin, according to this invention.
Figure 9C:
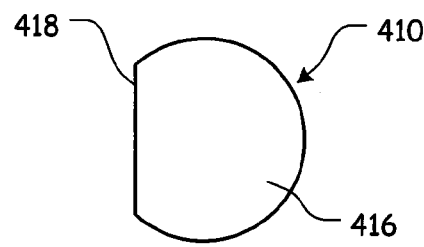
FIG. 9C illustrates a top view of the third exemplary embodiment of firearm pivot pin, according to this invention.

FIGS. 9A-9C illustrate certain elements and/or aspects of a third exemplary embodiment of a firearm pivot pin 400, according to this invention. As illustrated in FIGS. 9A-9C, the pivot pin 400 includes at least some of a head 410, a shank 430, a shank portion 432, a terminal surface 434, a shoulder 412, a chamfer 433, an indention 435, an intermediate portion 436, a crown 416, an elongate primary channel 440, primary recesses 442, an installation recess 443, a chamfer 444 (not shown), an installation channel 445, a flat 418, and a face 413.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate primary channel 340, the primary recesses 342, the installation recess 343, the chamfer 344 (not shown), the installation channel 345, the flat 318, and the face 313, as described above with reference to the pivot pin 300 of FIGS. 8A-8C.

However, as illustrated in FIGS. 9A-9C, the surface of the face 413 is textured to provide greater purchase on the head 410 of the pivot pin 400. The surface of the face 413 may be textured using, for example, stippling, knurling, checkering, annular rings, or other patterns. Providing texture to the surface of the face 413 can aid in transitioning the pivot pin 400 from a locking position to a release position.

Figure 10A:
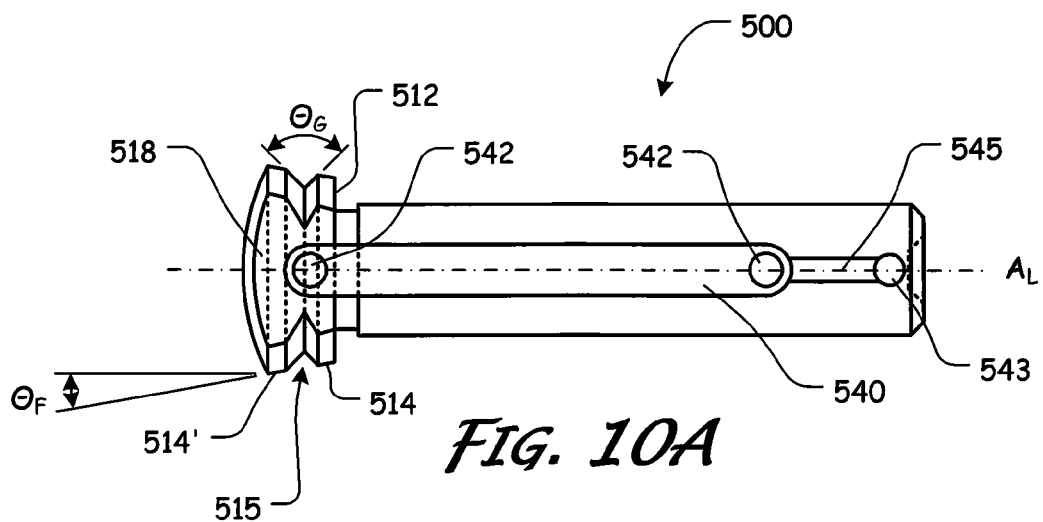
FIG. 10A illustrates a front view of a fourth exemplary embodiment of firearm pivot pin, according to this invention.
Figure 10B:
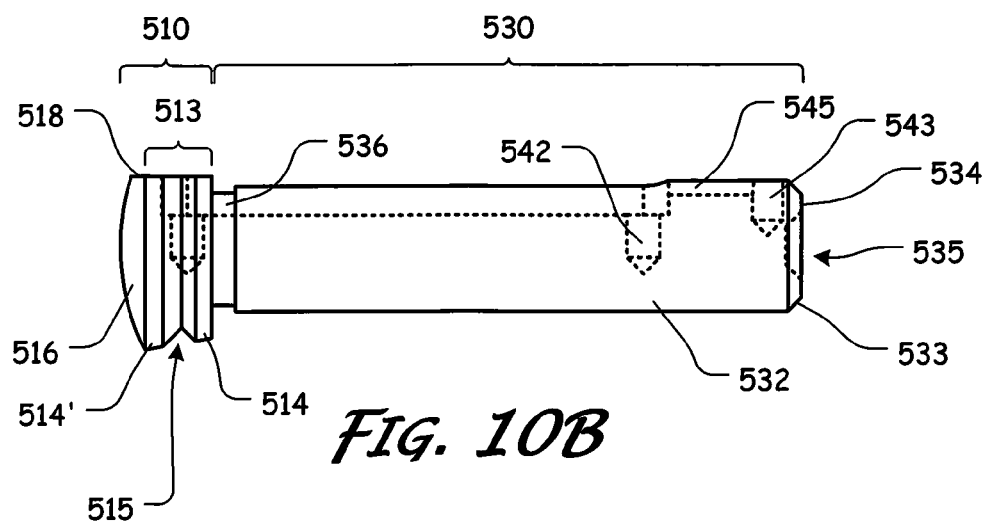
FIG. 10B illustrates a left side view of the fourth exemplary embodiment of firearm pivot pin, according to this invention.
Figure 10C:
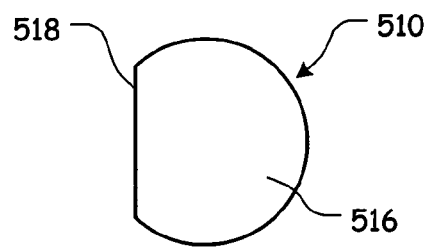
FIG. 10C illustrates a top view of the fourth exemplary embodiment of firearm pivot pin, according to this invention.

FIGS. 10A-10C illustrate certain elements and/or aspects of a fourth exemplary embodiment of a firearm pivot pin 500, according to this invention. As illustrated in FIGS. 10A-10C, the pivot pin 500 includes at least some of a head 510, a shank 530, a shank portion 532, a terminal surface 534, a shoulder 512, a chamfer 533, an indention 535, an intermediate portion 536, a crown 516, an elongate primary channel 540, primary recesses 542, an installation recess 543, a chamfer 544 (not shown), an installation channel 545, a flat 518, and a face 513.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate primary channel 340, the primary recesses 342, the installation recess 343, the chamfer 344 (not shown), the installation channel 345, the flat 318, and the face 313, as described above with reference to the pivot pin 300 of FIGS. 8A-8C. Furthermore, the surface of the face 513 may or may not be textured to provide greater purchase on the head 510 of the pivot pin 500.

However, as illustrated in FIGS. 10A-10C, a V-shaped groove 515 is formed in the face 513 to provide greater purchase on the head 510 of the pivot pin 500. In various exemplary, nonlimiting embodiments, the groove 515 is formed such that the side walls of the groove 515 are at an angle $\theta_G$ relative to one another and the side walls of the groove 515 converge with each other. It should be appreciated that as the groove 515 is viewed in cross section, the side walls converge at a point. As the groove 515 is formed around the face 513, the side walls of the groove 515 converge along a line. In certain exemplary embodiments, the angle $\theta_G$ is approximately 90°. In still other exemplary embodiments, the angle $\theta_G$ is any discrete angle between approximately 45° and 135°.

The groove 515 is positioned so as to divide the face 513 and create a first face portion 514 and a second face portion 514'. It should be appreciated that the surface of the first face portion 514 and/or the second face portion 514' may be substantially smooth or maybe textured using, for example, stippling, knurling, checkering, annular rings, or other patterns.

While the groove 515 is illustrated and described as being a V-shaped groove 515 having a V-shaped profile, it should be understood that the groove 515 may have a V, U, square, rectangular, round, semi-round, oval, angled, or other desired profile.

By providing the groove 515, an additional feature is provided to allow better purchase on the head 510 of the pivot pin 500.

Figure 11A:
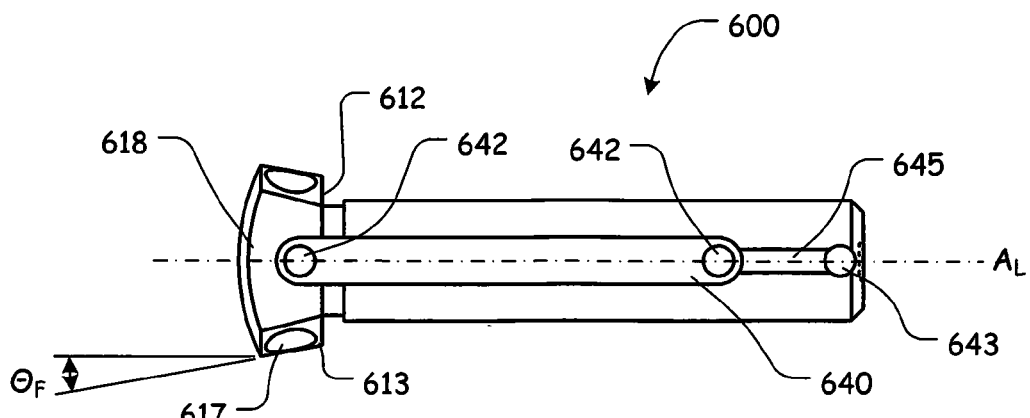
FIG. 11A illustrates a front view of a fifth exemplary embodiment of firearm pivot pin, according to this invention.
Figure 11B:
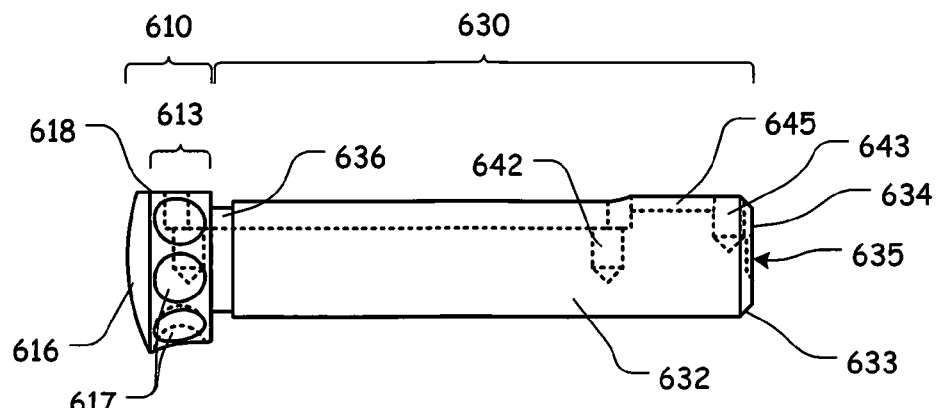
FIG. 11B illustrates a left side view of the fifth exemplary embodiment of firearm pivot pin, according to this invention.
Figure 11C:
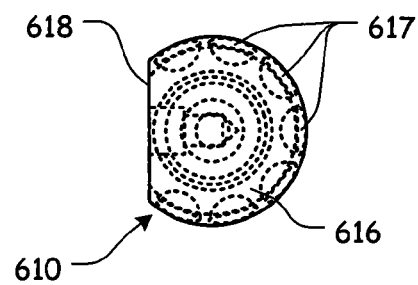
FIG. 11C illustrates a top view of the fifth exemplary embodiment of firearm pivot pin, according to this invention.

FIGS. 11A-11C illustrate certain elements and/or aspects of a fifth exemplary embodiment of a firearm pivot pin 600, according to this invention. As illustrated in FIGS. 11A-11C, the pivot pin 600 includes at least some of a head 610, a shank 630, a shank portion 632, a terminal surface 634, a shoulder 612, a chamfer 633, an indention 635, an intermediate portion 636, a crown 616, an elongate primary channel 640, primary recesses 642, an installation recess 643, a chamfer 644 (not shown), an installation channel 645, a flat 618, and a face 613.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate primary channel 340, the primary recesses 342, the installation recess 343, the chamfer 344 (not shown), the installation channel 345, the flat 318, and the face 313, as described above with reference to the pivot pin 300 of FIGS. 8A-8C.

However, as illustrated in FIGS. 11A-11C, a plurality of dimples 617 are formed in the face 613 to provide greater purchase on the head 610 of the pivot pin 600. In various exemplary, nonlimiting embodiments, the dimples 617 comprise evenly spaced spherical recesses formed in the face 613. In certain exemplary embodiments the dimples 617 may comprise other spaced recesses, such as, for example, pyramidal recesses, conical recesses, prismic recesses, cylindrical recesses, or other patterned recesses formed in the face 613.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

It is also noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A pin, comprising:
   a head, wherein at least a portion of said head extends from a shoulder to a crown;
   a shank that extends from said shoulder to a terminal surface, wherein at least a portion of said shank is at least temporarily magnetizable;
   a primary channel formed in a portion of said pin, wherein said primary channel comprises a substantially continuous recess that extends from a portion of said head, along a longitudinal axis of said pin, into a portion of said shank; and
   a detent installation channel formed in a portion of said pin, wherein said detent installation channel comprises a recess formed in a portion of said pin, and wherein said detent installation channel extends from a portion of said primary channel, towards said terminal surface.

2. The pin of claim 1, wherein said shank comprises an elongate, substantially cylindrical shank.

3. The pin of claim 1, wherein said pin is at least partially magnetized using an external magnetizing source.

4. The pin of claim 1, wherein at least a portion of said pin is temporarily magnetized.

5. The pin of claim 1, wherein at least a portion of said pin is permanently magnetized.

6. The pin of claim 1, wherein a depth of said primary channel is greater than a depth of said detent installation channel.

7. The pin of claim 1, wherein said detent installation channel has a width that is substantially different from a width of said primary channel and wherein said detent installation channel has a depth that is substantially different from a depth of said primary channel.

8. The pin of claim 1, wherein said detent installation channel is substantially straight.

9. The pin of claim 1, wherein said detent installation channel is at least partially curved.

10. The pin of claim 1, wherein said detent installation channel has a width that is substantially similar to a width of said primary channel and wherein said detent installation channel has a depth that is substantially similar to a depth of said primary channel.

11. The pin of claim 1, wherein said detent installation channel includes a detent installation recess formed proximate an end of said detent installation channel.

12. The pin of claim 11, wherein said detent installation recess is approximately 0.063 inches in diameter and extends approximately 0.060 inches from a surface of said shank.

13. The pin of claim 1, further comprising a face formed between at least a portion of said shoulder and said crown, wherein said face is formed at an angle of approximately 0°, 1°, 5°, 10°, 15°, 20°, 25°, 30°, 35°, 40°, 45°, 50°, 55°, 60°, 65°, 70°, 75°, 80°, 85°, or 90° relative to a longitudinal axis of said pin.

14. The pin of claim 1, wherein said detent installation channel extends from a portion of said primary channel, substantially along a longitudinal axis of said pin.

15. The pin of claim 1, wherein a chamfer is provided as a transitional surface between said terminal surface and an outer surface of said shank.

16. The pin of claim 1, further comprising at least one indention formed in said terminal surface.

17. The pin of claim 1, wherein said shank includes an intermediate portion, having a reduced diameter when compared to a diameter of said shank, and wherein said intermediate portion is formed proximate said shoulder.

18. The pin of claim 1, wherein a flat is provided in a portion of said head, wherein said flat is formed substantially parallel to a longitudinal axis of said pin.

19. A pin, comprising:
- a head, wherein said head extends from a shoulder to a crown;
- a shank, wherein said shank includes an elongate, cylindrical shank that extends from said shoulder to a terminal end, wherein at least a portion of said shank is at least temporarily magnetized;
- a primary channel formed in a portion of said pin, wherein said primary channel comprises a substantially continuous recess that extends along a longitudinal axis of said pin, into a portion of said shank; and
- a detent installation recess formed proximate a terminal end of said shank.

* * * * *